United States Patent [19]

James

[11] Patent Number: 4,569,207
[45] Date of Patent: Feb. 11, 1986

[54] HEAT PUMP HEATING AND COOLING SYSTEM

[76] Inventor: Larry S. James, 19322 Transhire Rd., Gaithersburg, Md. 20760

[21] Appl. No.: 927,768

[22] Filed: Jul. 25, 1978

Related U.S. Application Data

[63] Continuation of Ser. No. 789,700, Apr. 21, 1977, abandoned.

[51] Int. Cl.⁴ ............................................. F25B 27/00
[52] U.S. Cl. .............................. 62/235.1; 62/238.6; 62/325; 165/29; 165/140
[58] Field of Search ............... 62/325, 238 E, 238 R, 62/262, 406, 324, 160, 2

[56] References Cited

U.S. PATENT DOCUMENTS

| | | | |
|---|---|---|---|
| 2,257,478 | 9/1941 | Newton | 62/238 R |
| 3,069,867 | 12/1962 | Ringquist | 62/325 |
| 3,084,522 | 4/1963 | Hames, Jr. et al. | 62/262 |
| 3,276,516 | 10/1966 | Japhet | 62/325 |
| 3,545,224 | 12/1970 | Nicoski | 62/262 |
| 3,628,600 | 12/1971 | McFarlan | 62/325 |
| 3,636,721 | 1/1972 | Rex | 62/325 |
| 3,911,953 | 10/1975 | Crombie et al. | 62/325 |
| 3,996,759 | 12/1976 | Meckler | 62/238 E |
| 4,111,259 | 9/1978 | Lebduska | 62/2 |
| 4,123,003 | 10/1978 | Winston | 62/2 |
| 4,138,861 | 2/1979 | Jaroslav | 62/325 |
| 4,151,721 | 5/1979 | Kumm | 62/2 |
| 4,165,037 | 8/1979 | McCarson | 62/2 |

Primary Examiner—Margaret A. Focarino
Attorney, Agent, or Firm—Kemon & Estabrook

[57] ABSTRACT

Systems for transferring energy between a conditioned zone, a heat source or sink liquid, and an ambient zone including combination liquid-source, air-source heat pumps with multi-fluid reversing means and an easily manufactured multi-fluid heat exchanger. Specifically three types of heat pumps: a split system of unitary type with conventional refrigerant reversing means, multi-fluid heat exchanger(s), and heat source or sink fluid reversing means; a self-contained or packaged type with conventional refrigerant reversing means, a multi-fluid heat exchanger, a conventional liquid-to-refrigerant heat exchanger, heat source or sink liquid reversing means, and innovative component arrangement which allows ambient air to be utilized as a heat source or sink fluid; a self-contained or packaged type with innovative component arrangement which allows air reversing means, multi-fluid heat exchangers, and heat source or sink liquid reversing means.

22 Claims, 25 Drawing Figures

HEAT PUMP HEATING AND COOLING SYSTEM

This is a continuation of application Ser. No. 789,700 filed Apr. 21, 1977, now abandoned.

Disclosure Document No. 05 2383 is referenced as an original Invention Disclosure with respect to the present invention.

BACKGROUND OF THE INVENTION

Presently available heat pumps, in the heating mode, reverse the function of the indoor and outdoor heat exchangers from that which we are accustomed to seeing on air conditioners. The indoor coil becomes the condenser and the outdoor coil (or heat exchanger) becomes the evaporator.

In a typical air-source heat pump (the most popular type), the refrigerant is metered to the outdoor evaporator coil such that the evaporating temperature is below that of the outdoor air. Heat energy flows therefore from the evaporator is compressed by the compressor and the hot discharge gas flows to the indoor coil which functions as the condenser. The condensing temperature being higher than the indoor air stream, allows heat flow to the indoor air.

As the temperature of the outdoor coil drops below freezing, it starts to frost up. This frost accumulation reduces that heat transfer rate of the coil surface and impedes the flow of the air through the coil. If the frost is not removed periodically, the heat pump will suffer a major loss of heating capacity.

Because of design temperature difference between the outdoor evaporator coil and the ambient, most air-source heat pumps start to frost when the outdoor ambient temperature falls below 45° F., approximately.

SUMMARY OF THE INVENTION

This invention relates generally to devices for transferring heat energy from a low temperature locality to a high temperature locality and more specifically to a heat pump for accomplishing such transfer by mechanical means including the compression and expansion of a fluid by mechanical refrigeration. This invention relates more particularly to such an apparatus as applied to heating or cooling a building by transferring heat from or to a heat source or sink fluid or the ambient air or a combination of these.

This invention provides novel heat pump apparatus which avoid disadvantages of the prior art in addition to incorporating new functional modes which allow operational flexibility never before available.

The invention provides a novel combination liquid-source, air-source, reverse air flow self-contained heat pump with demand defrost cycle, located inside or outside the conditioned space, equipped with multi-fluid evaporator and condenser heat exchangers allowing operation with ambient air or a liquid as the heat source or sink fluid; which may operate additionally as a stored fluid heater or chiller while utilizing ambient or conditioned space air as a heat source or sink fluid while utilizing the refrigerant circuit as required.

The invention also provides a unitary type water-source, air-source heat pump equipped with multi-fluid heat exchangers allowing operation utilizing ambient air or a liquid, such as a solar heated liquid, as the heat source or heat sink fluid; a hot water heating or chilled water cooling fan coil unit; and a stored fluid heater or chiller while utilizing ambient or conditioned space air as a heat source or sink fluid with the aid of the refrigerant circuit as needed.

The invention further provides a self-contained type combination liquid-source, air-source heat pump equipped with one multi-fluid and one liquid-to-refrigerant heat exchanger which allow operation as; a conventional water-source heat pump utilizing a liquid, as the heat source fluid; a stored fluid heater or chiller using ambient or conditioned space air as a heat source or sink fluid respectively utilizing the refrigerant circuit as required; and a hot water heating or chilled water cooling fan coil unit.

The invention further provides a multi-fluid heat exchanger for such heat pump systems which is, by design, economical to manufacture.

In the preferred embodiment, the invention comprises refrigeration systems comprising a condenser, expansion means, evaporator and compressor. The arrangement of these several components enable the several unit configurations, equipped with one or more mulit-fluid heat exchangers, to operate as; a combination liquid-source, air-source heat pump; chilled or heated water fan coil unit; or a liquid heating or chilling unit, utilizing ambient or conditioned space air or a heated or cooled liquid as the heat source or sink.

DESCRIPTION OF THE PREFERRED EMBODIMENTS

Figure 1:
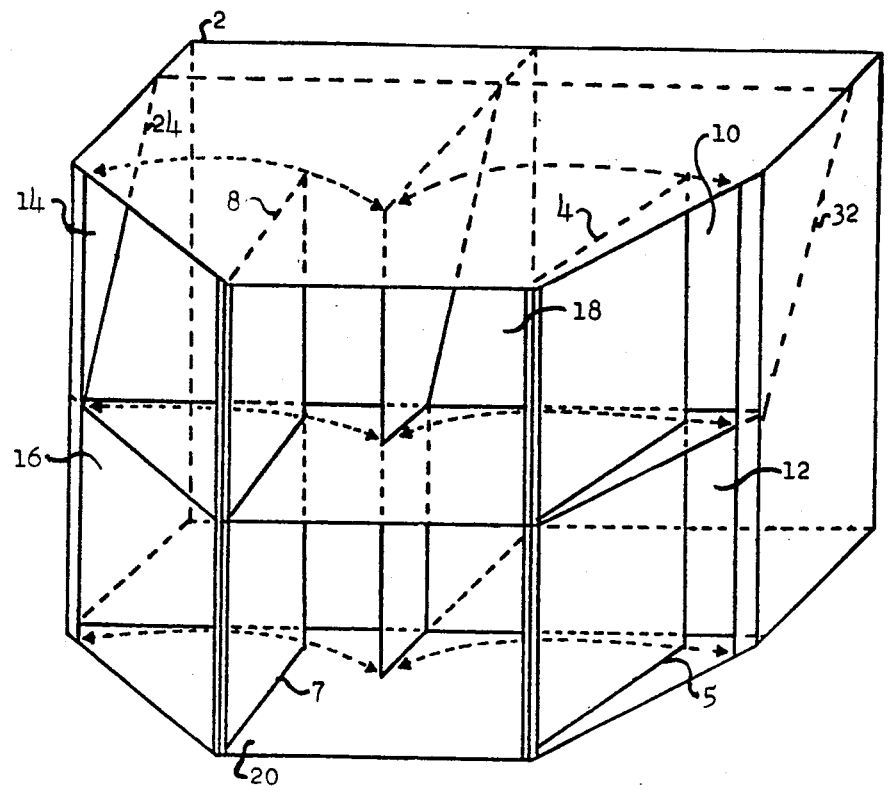
FIG. 1 is a diagrammatic, perspective view of the housing for a combination liquid-source, air-source, reverse air-flow, self-contained, damped defrost cycle, type heat pump apparatus embodying my invention, with certain parts being omitted.

Referring now to FIG. 1 of drawings, the self-contained reverse air flow type heat pump comprises a refrigeration apparatus contained in a casing 2 provided with air flow control dampers 4, 5, 7, and 8, evaporator heat exchanger 32, evaporator in-take opening 10, evaporator discharge opening 12, condenser heat exchanger 24, condenser in-take opening 14, condenser discharge opening 16 and combination condenser-evaporator discharge opening 20. Depending upon the operation mode and installation option, as will be further described with reference to FIGS. 4 to 19 and 20 and 21 respectfully, the combination openings 18 and 20 serve as ambient air in-take and discharge, and conditioned space supply and return air discharge and in-take openings respectively.

Figure 2:
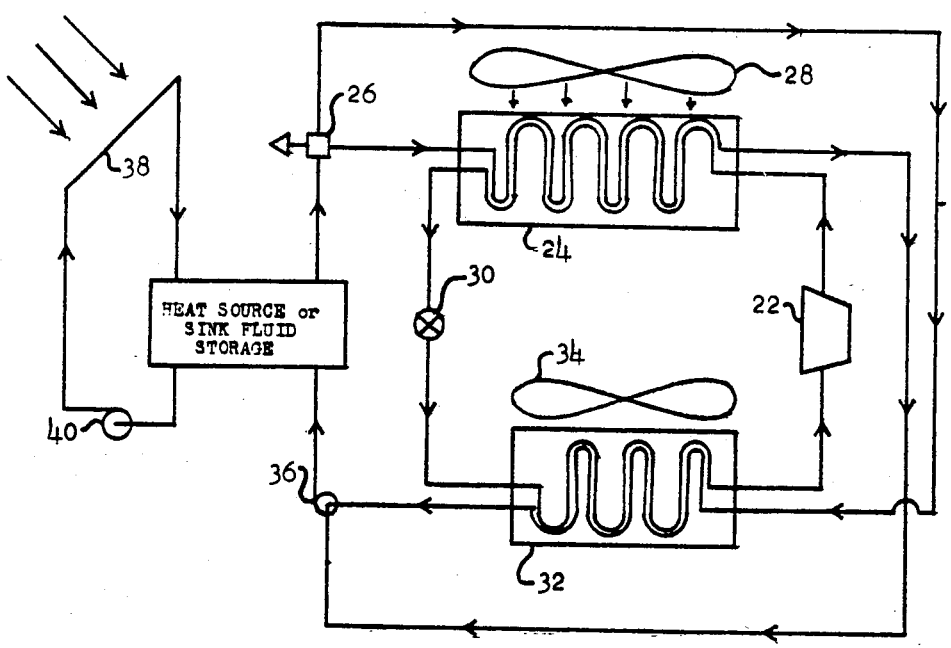
FIG. 2 is a fluid schematic representation of the apparatus in FIG. 1 in a typical solar assisted heating application.

FIG. 2 of the drawings is a fluid schematic representation of the unit shown in FIG. 1 in one of several possible solar assisted heating applications. A commonly known refrigerant such as, for example, freon and the like in closed circuit 23 is compressed by a commonly known, electrically driven conpressor 22, condensed in the heat exchanger 24, expanded through a conventional expansion valve means 30 and evaporated in the heat exchanger 32. A heat transfer fluid such as water or the like is circulated by an electrically driven pump 36 in heat exchange relation with the evaporator heat exchanger 32 by the evaporator circuit 25 and/or heat exchange relation with the condenser heat exchanger 24 by the condenser circuit 27. A commonly known three-way control valve or the like 26 controls the flow in circuits 25 and 27 thereby allowing thermal energy to be added to the refrigerant circuit 23 within the evaporator heat exchanger 32 and taken away from the refrigerant circuit 23 within the condenser heat exchanger 24. Depending upon the operational mode and installation option, as will be further described with reference to FIGS. 4 to 19 and 20 and 21 respectfully, thermal energy may be transferred from the refrigerant circuit 23, through the intermediate fluid circuit 27 and into the air stream by the condenser fan 28. Thermal energy may be transferred from the air stream through the intermediate fluid circuit 25 into the refrigerant circuit 23 in the evaporator heat exchanger 32 by the evaporator fan 34.

Figure 3:
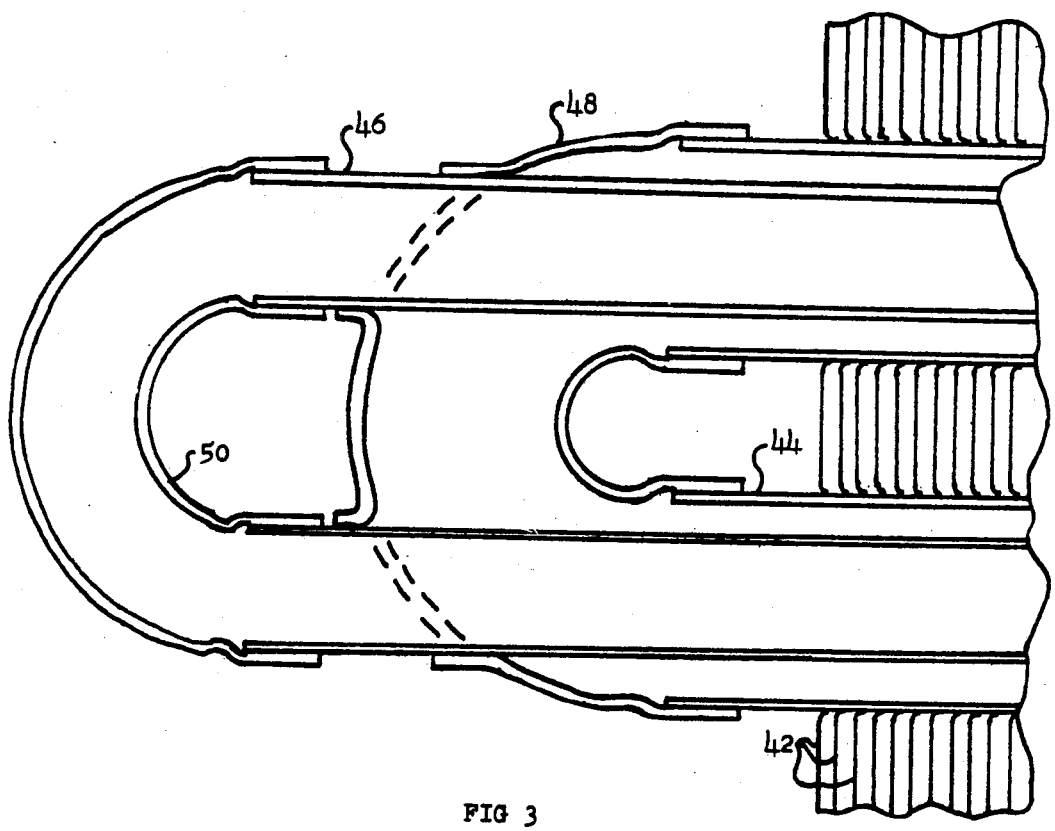
FIG. 3 is a detailed section view of a typical return bend construction technique which enables economical manufacturing of the housing for the multi-fluid heat exchanger embodying my invention.

FIG. 3 of the drawing illustrates a multiple fluid, two liquid circuits and one air circuit, heat exchanger typical return bend section view comprised of commonly known plate fins or the like 42, external tubing 44, internal tubing 46, an external return bend 48, and an internal return bend 50, which is economically manufacturable utilizing commonly known manufacturing techniques presently used in the manufacture of conventional plate finned tube heat exchangers.

Figure 4:
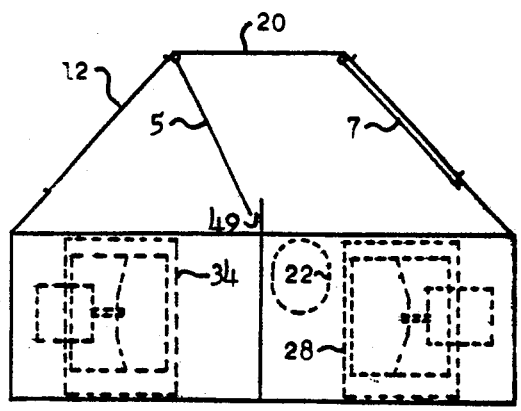
FIG. 4 is a reduced top plan view of the apparatus shown in FIG. 1 showing the lower section dampers positioned for refrigerant circuit aided heating.
Figure 5:
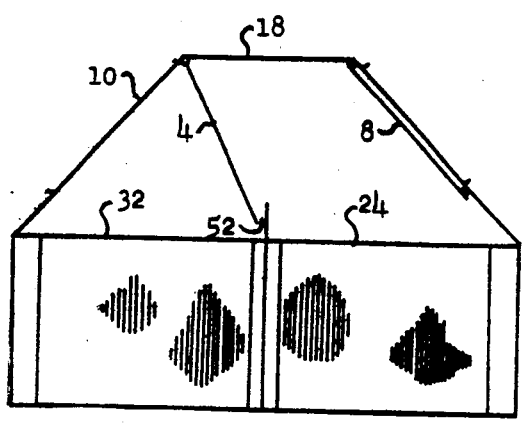
FIG. 5 is a reduced top plan view of the apparatus shown in FIG. 1 showing the upper section dampers positioned for refrigerant circuit aided heating.

When the self-contained reverse air flow type apparatus is to be used for heating, with the aid of the refrigerant circuit, dampers 7, 5, 4, and 8 positioned as shown in the lower section FIG. 4 and the upper section FIG. 5 respectively direct conditioned space return air through unit intake opening 18 and, if required, ventilation air through adjustable gap 52, through multi-fluid condenser coil 24, into fan unit 28 FIG. 4 and discharged through unit outlet opening 20 into conditioned space supply duct, and if required, through adjustable exhaust gap 49, while, during operation as an air-source heat pump, ambient air is directed through evaporator intake 10 FIG. 5 through multi-fluid evaporator coil 32, into unit fan 34 FIG. 4 and discharged through unit outlet opening 12 or during operation as a liquid-source heat pump, unit fan 34 is de-energized, allowing the evaporator coil 24 to be utilized as a heat source liquid-to-refrigerant heat exchanger.

Figure 6:
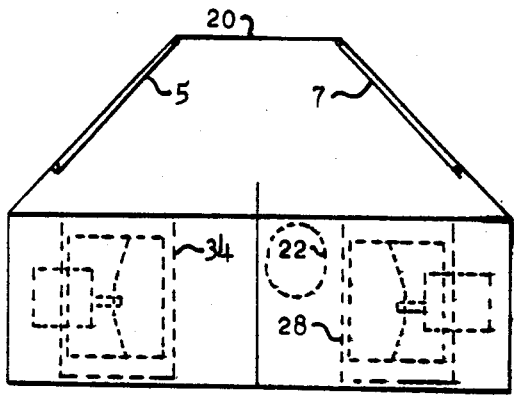
FIG. 6 is a reduced top plan view of the apparatus shown in FIG. 1 showing the lower section dampers positioned to utilize one or both heat exchangers as heating coils.
Figure 7:
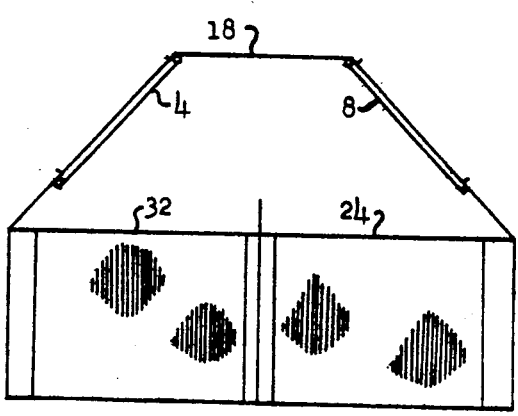
FIG. 7 is a reduced top plan view of the apparatus shown in FIG. 1 showing the upper section dampers positioned to utilize one or both heat exchangers as heating coils.

When the self contained reverse air flow type apparatus is to be used as a fan coil unit for heating, dampers 7, 5, 4, and 8 positioned as shown in the lower section FIG. 6 and the upper section FIG. 7 respectively, direct conditioned space return air through the unit intake opening 18, throuth one or both, as required, of the multi-fluid heat exchangers, utilized as heat source liquid-to-conditioned space air heat exchangers, 24 and 32 FIG. 7 into one or both of the unit fans 28 and 34 respectively FIG. 6 and discharged through unit outlet opening 20 and into the conditioned space supply distribution system.

Figure 8:
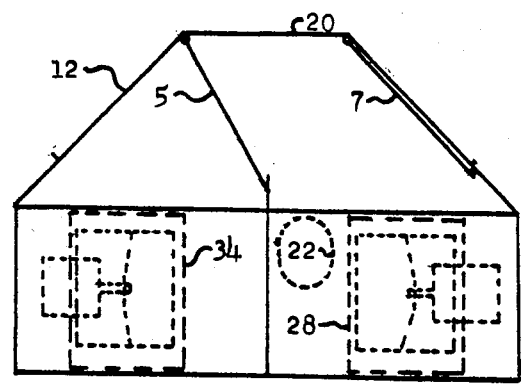
FIG. 8 is a reduced top plan view of the apparatus shown in FIG. 1 showing the lower section dampers positioned for refrigerant circuit aided, stored heat source, fluid heating.
Figure 9:
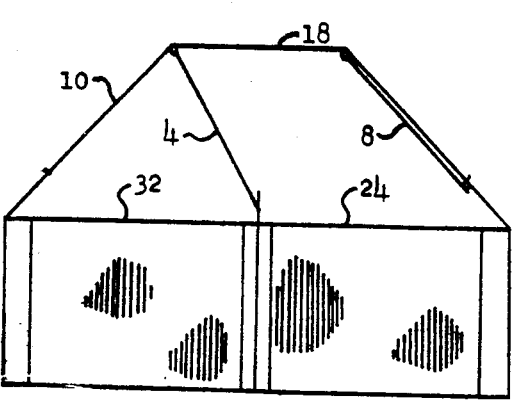
FIG. 9 is a reduced top plan view of the apparatus shown in FIG. 1 showing the upper section dampers positioned for refrigerant circuit aided, stored heat source, fluid heating.

When the self-contained, reverse air flow type apparatus is to be used as a fluid heater, dampers 7, 5, 4, and 8 positioned as shown in the lower section FIG. 8 and the upper section FIG. 9 respectively, direct ambient, when utilizing ambient air as the heat source, air into the unit evaporator intake opening 10, FIG. 9 through the multi-fluid evaporator 32, into the unit fan 34 FIG. 8 and discharged through the unit evaporator outlet opening 12, while the multi-fluid condenser coil 24 is utilized as a heated fluid-to-refrigerant heat exchanger. When a liquid is to be the heat source, the unit fan 34 is de-energized allowing the multi-fluid evaporator coil to function as a liquid-to-refrigerant heat exchanger.

Figure 10:
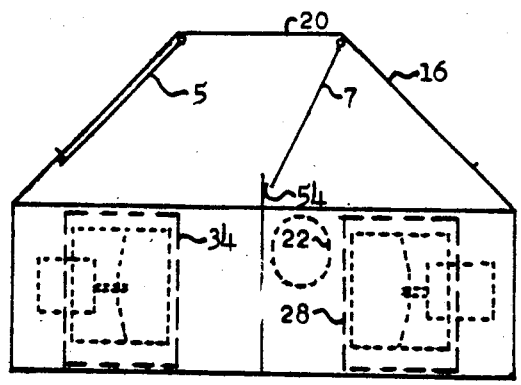
FIG. 10 is a reduced top plan view of the apparatus shown in FIG. 1 showing the lower section dampers positioned for refrigerant circuit aided cooling.
Figure 11:
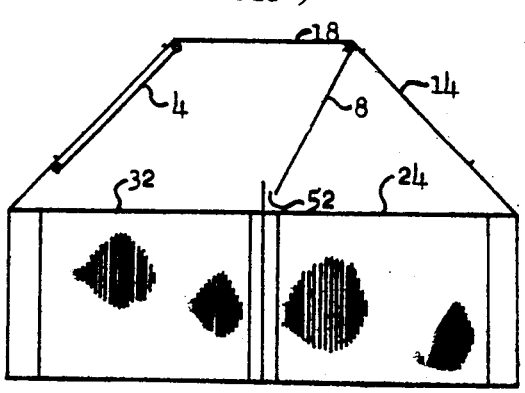
FIG. 11 is a reduced top plan view of the apparatus shown in FIG. 1 showing the upper section dampers positioned for refrigerant circuit aided cooling.

When the self-contained reverse air-flow type apparatus is to be used for cooling, with the aid of the refrigerant circuit, dampers 7, 5, 4, and 8 positioned as shown in the lower section FIG. 10 and the upper section FIG. 11 respectively direct conditioned space return air through unit intake opening 18 and, if required, ventilation air through adjustable gap 52, through multi-fluid evaporator coil 32 FIG. 11 into fan unit 34 FIG. 10 and is discharged through unit outlet opening 20 into the conditioned space supply duct and, if required, through adjustable exhaust gap 54, while during operation as an ambient air-source heat pump, ambient air is directed through the condenser intake opening 14 FIG. 11 through multi-fluid condenser coil 24, into fan unit 28 FIG. 10 and discharged through condenser outlet opening 16 or during operation as a water-source heat pump, unit fan 28 is de-energized, allowing the condenser coil 24 to be utilized as a heat source liquid-to-refrigerant heat exchanger as the threeway control valve 26 in FIG. 2 provides the required liquid flow through the condenser multi-fluid heat exchanger.

Figure 12:
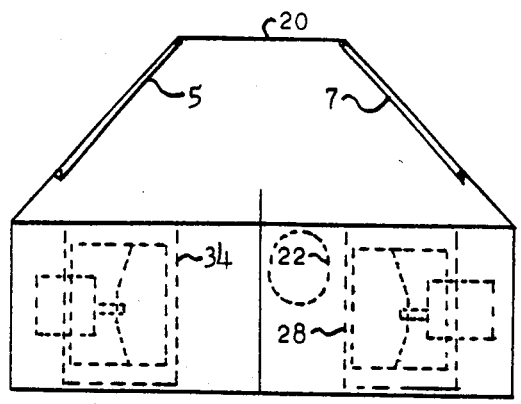
FIG. 12 is a reduced top plan view of the apparatus shown in FIG. 1 showing the lower section dampers positioned to utilize one or both heat exchangers as cooling coils.
Figure 13:
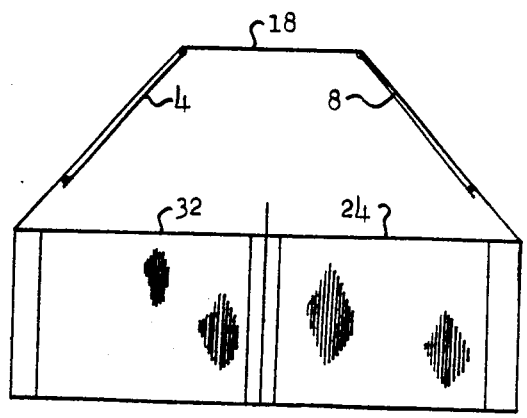
FIG. 13 is a reduced top plan view of the apparatus shown in FIG. 1 showing the upper section dampers positioned to utilize one or both heat exchangers as cooling coils.

When the self-contained reverse air flow type apparatus is to be used as a fan coil unit for cooling, dampers 7, 5, 4, and 8 positioned as shown in the lower section FIG. 12 and the upper section FIG. 13 respectively, direct conditioned space return air through the unit intake opening 18, through one or both, as required, of the multi-fluid heat exchangers, utilized as heat sink liquid-to-conditioned space air heat exchangers 32 and 24 FIG. 13 into one or both of the unit fans 28 and 34 FIG. 12 and discharged through unit outlet opening 20 and into the conditioned space supply distribution system.

Figure 14:
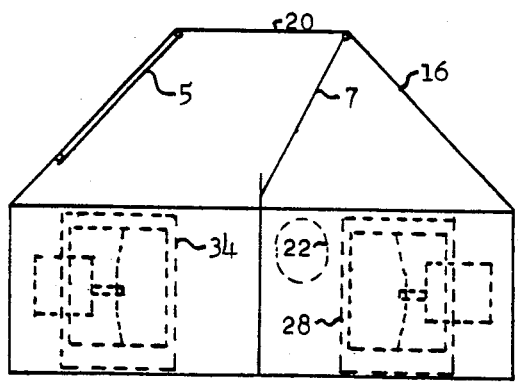
FIG. 14 is a reduced top plan view of the apparatus shown in FIG. 1 showing the lower section dampers positioned for refrigerant circuit aided, stored heat sink, fluid cooling.
Figure 15:
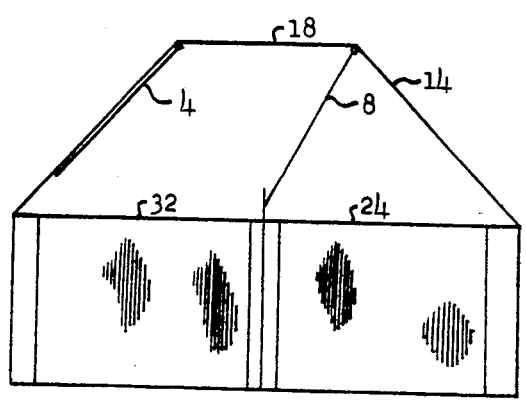
FIG. 15 is a reduced top plan view of the apparatus shown in FIG. 1 showing the upper section dampers positioned for refrigerant circuit aided, stored heat sink, fluid cooling.

When the self-contained reverse air flow type apparatus is to be used as a refrigerant circuit aided fluid chiller, dampers 7, 5, 4, and 8 positioned as shown in the lower section FIG. 14 and the upper section FIG. 15 respectively, direct ambient, when utilizing ambient air as the heat source, air into the unit condenser intake opening 14 FIG. 15 through the multi-fluid condenser 24 into the unit fan 28 FIG. 14 and discharged through the unit outlet opening 16, while the multi-fluid evaporator coil 32 is utilized as a cooled fluid-to-refrigerant heat exchanger, or if required, conditioned space air may be utilized as the heat sink with dampers 7, 5, 4, and 8 positioned as shown in the lower section FIG. 8 and the upper section FIG. 9 respectively. When a liquid is to be the heat sink, the unit fan 28 is de-energized allowing the multi-fluid condenser coil 24 to function as a liquid-to-refrigerant heat exchanger.

Figure 16:
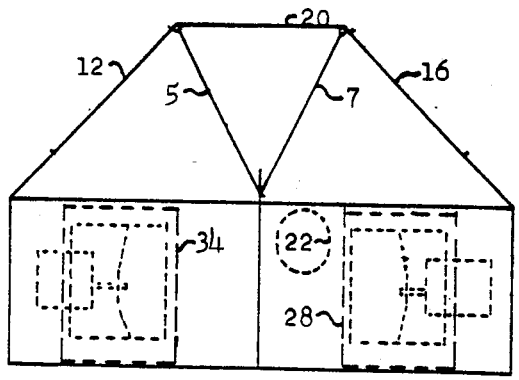
FIG. 16 is a reduced top plan view of the apparatus shown in FIG. 1 showing the lower section dampers positioned for direct stored fluid heating or cooling.
Figure 17:
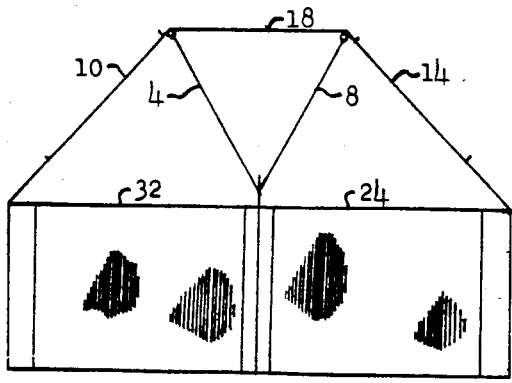
FIG. 17 is a reduced top plan view of the apparatus shown in FIG. 1 showing the upper section dampers positioned for direct stored fluid heating or cooling.

When the self-contained reverse air flow type apparatus is to be used as a direct fluid heater or chiller, dampers 7, 5, 4, and 8 positioned as shown in the lower section FIG. 16 and the upper section FIG. 17 respectively direct ambient air, when ambient air is used as the heat source or sink respectively, through the evaporator intake 10 and/or, as required, the condenser intake opening 14 FIG. 17, through multi-fluid evaporator coil, utilized as a cooled or heated liquid-to-ambient or conditioned space air heat exchanger, 32 and/or, as required, multi-fluid condenser coil, also utilized as a cooled or heated liquid-to-ambient or conditioned space air heat exchanger, 24 respectively, into the fan units 34 and 28 FIG. 16 and discharged through the evaporator outlet opening 12 and the condenser outlet opening 16 respectively. Conditioned space air may be utilized as the heat source or sink fluid when conditioned space heating or cooling is required with dampers 7, 5, 4, and 8 positioned as shown in FIG. 12 and FIG. 13.

Figure 18:
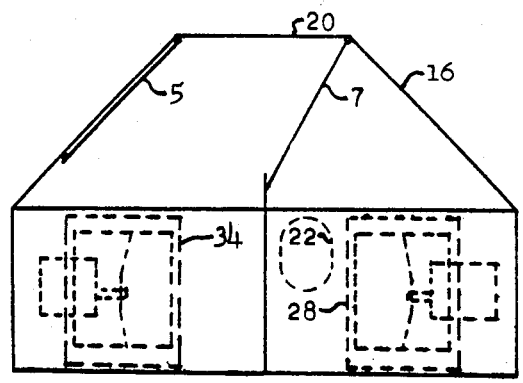
FIG. 18 is a reduced top plan view of the apparatus shown in FIG. 1 showing the lower section dampers positioned to utilize outside air as the cooling or heating fluid.
Figure 19:
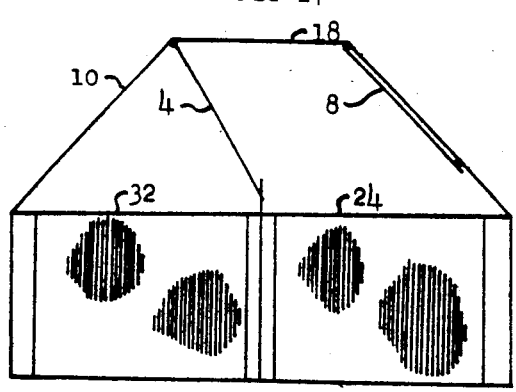
FIG. 19 is a reduced top plan view of the apparatus shown in FIG. 1 showing the upper section dampers positioned to utilize outside air as the cooling or heating fluid.

When the self-contained reverse air-flow type apparatus is to be used as a ventilation unit or an enthalpy controlled ambient air economizing heating or cooling unit, dampers 5, 7, 4, and 8 positioned as shown in the lower section FIG. 18 and the upper section FIG. 19 direct conditioned space return air through intake opening 18 FIG. 19, through condenser coil 24, into fan unit 28 FIG. 18, and discharges to the ambient through the condenser outlet opening 16, while make-up ambient air is drawn into the unit through the evaporator intake opening 10 FIG. 19, through the evaporator coil 32, into the unit fan 34 FIG. 18, and discharges through the outlet opening 20 into the conditioned space supply distribution system.

Figure 20:
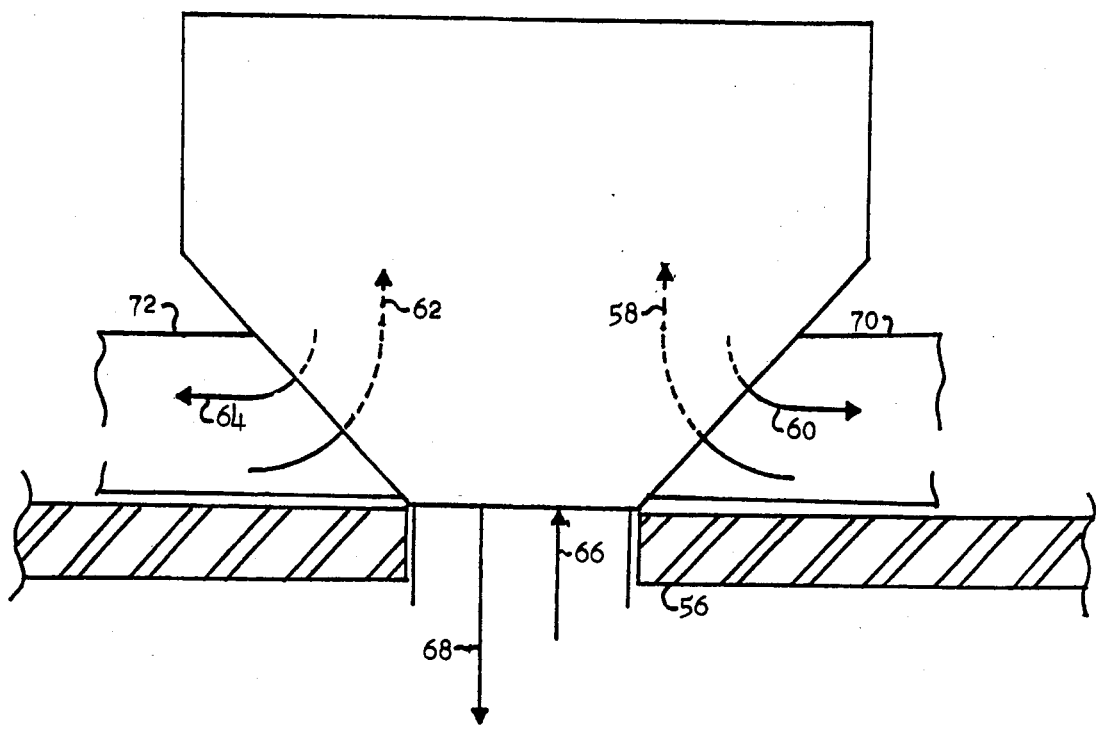
FIG. 20 is a plan view similar to FIG. 21 showing the apparatus in FIG. 1 located inside the conditioned space and adjacent to the outside of an outside wall.

Referring now to FIG. 20 which depicts the self-contained reverse air flow type apparatus installed inside the conditioned space adjacent to the inside of an exterior wall 56, illustrating the; cooling mode return (upper level) air flow 58, cooling mode supply (lower level) air flow 60, heating mode return (upper level) air flow 62, heating mode supply (lower level) air flow 64, ambient intake (upper level) air flow 66, ambient discharge (lower level) air flow 68, cooling supply (lower level) and return (upper level) duct 70 and heating supply (lower level) and return (upper level) duct 72.

Figure 21:
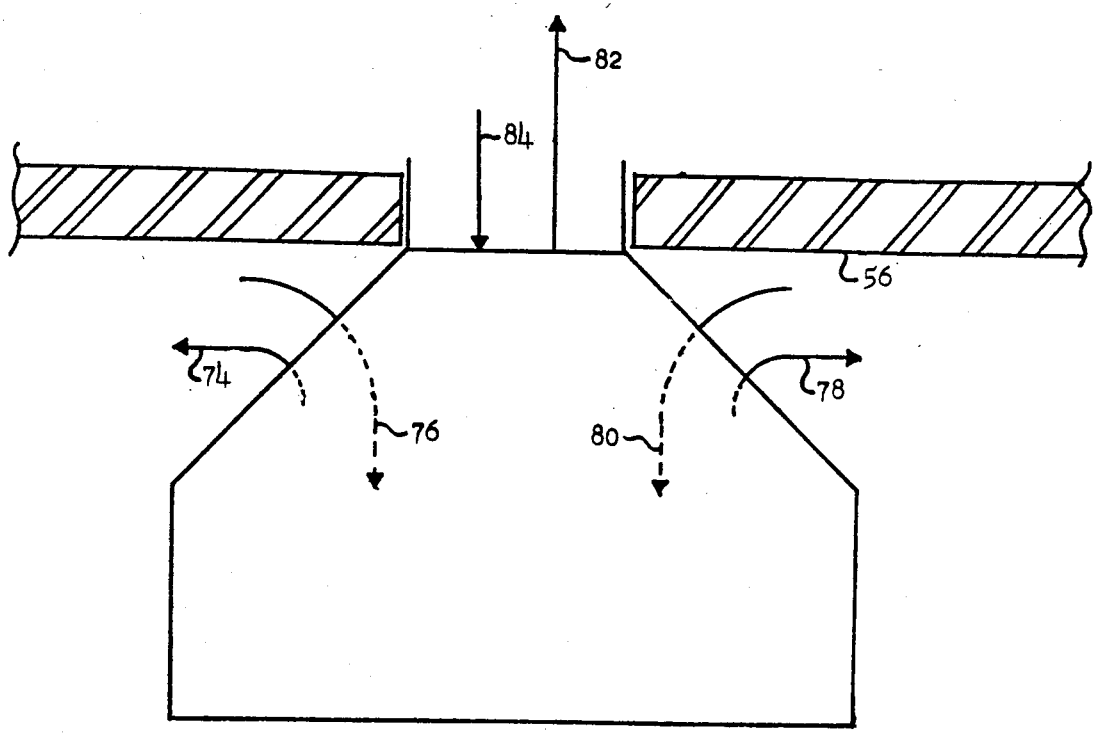
FIG. 21 is a plan view showing the apparatus in FIG. 1 located outside of the conditioned space and adjacent to the outside wall.

Referring now to FIG. 21 depicting the self-contained reverse air flow type apparatus installed adjacent to the outside of an exterior wall 56 illustrating the; evaporator ambient discharge (lower level) air flow 74, evaporator ambient intake (upper level) air flow 76, condenser ambient discharge (lower level) air flow 78, condenser ambient intake (upper level) air flow 80, conditioned space supply (lower level) 82, and conditioned space return (upper level) 84.

OTHER HEAT PUMP CONFIGURATIONS

Figure 22:
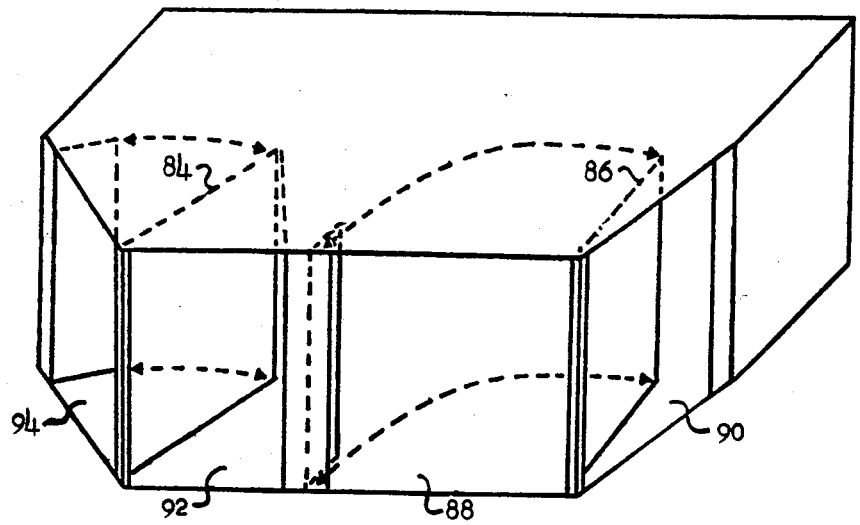
FIG. 22 is a diagrammatic, perspective view of a self-contained type combination liquid-source, air-source heat pump apparatus equipped with one multi-fluid and one liquid-to-refrigerant heat exchanger, embodying my invention with certain parts being omitted.
Figure 23:
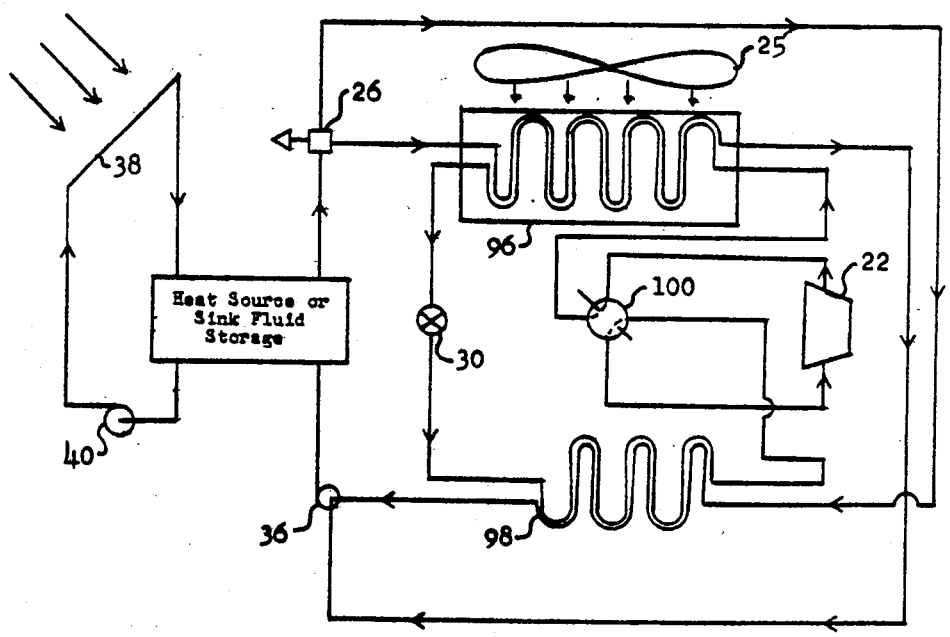
FIG. 23 is a fluid schematic representation of the apparatus shown in FIG. 22 in one of several possible solar assisted heating applications.
Figure 24:
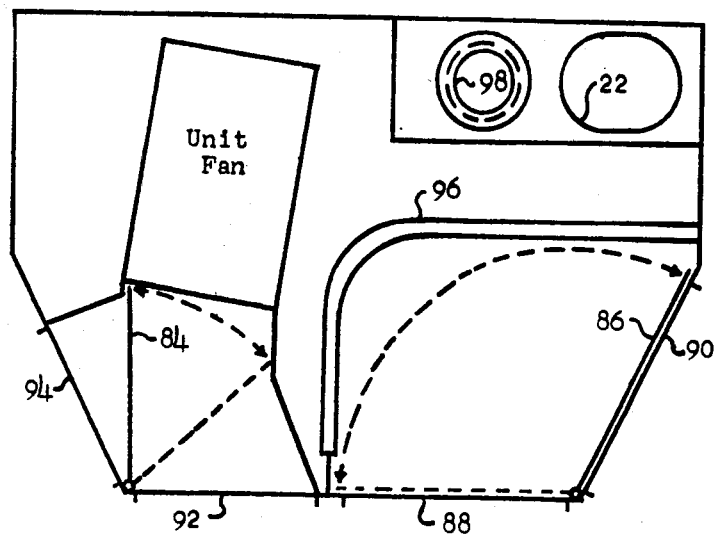
FIG. 24 is a reduced top plan view of the apparatus shown in FIG. 22 showing the dampers positioned for a typical operating cycle similar to those shown for the apparatus shown in FIG. 1.

Referring to FIG. 22 of the drawing, the self-contained reverse refrigerant flow type heat pump comprises a refrigeration apparatus provided with air flow control dampers 84 and 86, evaporator or condenser intake openings 88 and 90, fan discharge openings 92 and 94 which serve, depending on the operational mode and installation option, as ambient air intake and discharge, and conditioned space supply and return air openings. Represented schematically in FIG. 23 of the drawing which depicts this unit in one of several possible solar assisted heating applications where a commonly known refrigerant such as, freon, ammonia and the like; is compressed by a commonly known electrically driven compressor of the like 22, condensed in either the multi-fluid heat exchanger 96 or the conventional refrigerant-to-liquid heat exchanger 98 or the like, while refrigerant flow selection is controlled by the commonly known refrigerant reversing valve or the like 100, expanded through a commonly known expansion valve or the like 30, evaporated in the multi-fluid heat exchanger 96 or the conventional refrigerant to liquid heat exchanger 98, depending, as in the condensing case, on the refrigerant flow selection as controlled by the commonly known refrigerant reversing valve or the like 100 and returned back to the compressor 22 to complete the well known vapor compression refrigeration cycle, while the conditioned space air is directed into the intake opening 90 or 88 FIG. 24, depending on the installation option, through the multi-fluid heat exchanger 96, into the fan unit 102 and discharged through outlet openings 92 and 94.

Figure 25:
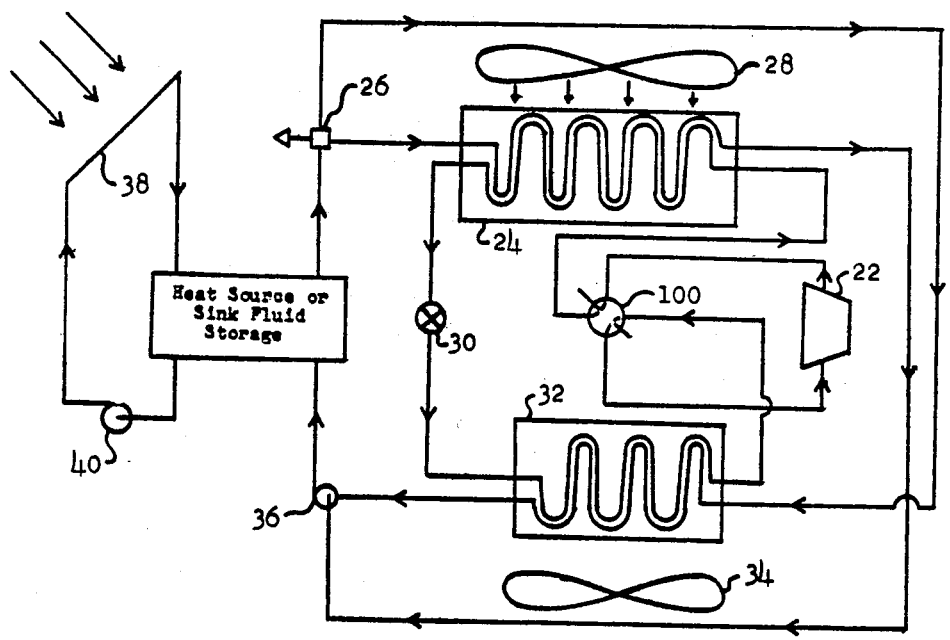
FIG. 25 is a fluid schematic representation of a unitary type heat pump apparatus embodying my invention in one of several possible solar assisted heating applications.

Referring now to FIG. 25 of the drawing, the unitary type liquid-source, air-source heat pump comprises a refrigeration apparatus as schematically represented, provided with an indoor air handler 34, an outdoor air handler 28, an indoor multi-fluid heat exchanger 32, an outdoor multi-fluid heat exchanger 24, a commonly known refrigerant expansion valve or the like 30, a commonly known refrigerant reversing valve or the like 100, and an electrically driven refrigeration compressor or the like 22. Control of the variable flow pump 36, the three-way control valve 26 and one or both air handling units 28 and 34 provides proper partial load cooling while maintaining the required level of space dehumidification.

What has been set forth above is intended as exemplarly of teachings in accordance with the invention to enable those skilled in the art in the practice there of. It should therefore, be understood that, within the scope of the appended claims, the invention may be practiced other than as specifically described.

What is new and therefore intended to be protected by Letters Patent of the United States is:

1. A system for transferring energy between a conditioned zone, a heat source or sink liquid, and an ambient zone comprising;
    refrigeration apparatus employing a liquefiable refrigerant and including compressor means, condenser heat exchange means, expansion means and evaporator heat exchange means connected in series in closed cycle arrangement;
    housing means for said refrigeration apparatus including diverter means positionable to control the direction and rate of flow of ambient and conditioned air over said condenser and evaporator heat exchanger means;
    a closed liquid filled path having portions in heat exchange relation with refrigerant carrying conduits in at least one of said heat exchange means; and
    means in said path for controlling the flow of liquid therein.

2. A system as defined by claim 1 including solar heating means arranged to add heat to said liquid.

3. A system as defined by claim 2 including a liquid storage means in communication with the liquid in said closed path.

4. A system as defined by claim 3 including partial load control in conjunction with said liquid direction and flow rate control means.

5. A system as defined by claim 1 including solar heating means arranged to add heat to said liquid.

6. A system as defined by claim 5 including a liquid storage means in communication with the liquid in said closed path.

7. A system as defined by claim 6 including partial load control in conjunction with said liquid direction and flow rate control means.

8. A system as defined by claim 1 including refrigerant diverter means operable to control the direction of flow of said liquifiable refrigerant.

9. A system for transferring energy between an interior conditioned zone, heat source or sink liquid and exterior ambient comprising:
    a closed refrigerant path including an interior heat exchanger, an exterior heat exchanger, refrigerant expansion means and a compressor for circulating refrigerant therethrough and valve means for controlling the direction of refrigerant flow, whereby either heat exchanger may function as an evaporator or condenser;
    a closed liquid path including at least one heat exchanger forming an integral part of at least one of said interior and exterior heat exchangers;
    means for circulating ambient air over said exterior heat exchanger;
    means for circulating interior air over said interior heat exchanger; and
    means for controlling the flow of liquid in said closed liquid path.

10. A system as defined by claim 9, in which said closed liquid path includes a pair of heat exchangers, each forming an integral part respectively of said interior and exterior heat exchangers.

11. A heat transfer and storage system for maintaining a temperature within an enclosure comprising:
    a compressor for compressing vaporous refrigerant;
    an outdoor heat exchange coil located outside the enclosure;
    a refrigerant expansion device;
    refrigerant flow reversing means;
    heat storage means for storing a heat transfer fluid;
    a three medium heat exchanger located within the enclosure and including a first heat exchange coil, a second heat exchange coil, heat transfer means thermally connecting the first and second heat exchange coils, and means to pass ambient air over the first and second coils;
    first connecting means connecting the compressor, the outdoor heat exchange coil, the refrigerant expansion device, the refrigerant flow reversing means, and the first heat exchange coil to form a reversible, vapor compression refrigeration system for transferring heat between the outdoor coil and the three medium heat exchanger; and
    second connecting means connecting the heat storage facility and the second heat exchange coil of the three medium heat exchanger, wherein the heat transfer fluid circulates and transfers heat between the heat storage facility and the three medium heat exchanger.

12. The apparatus of claim 11 wherein said heat storage means comprises a reservoir of water.

13. The apparatus of claim 12 further including means for transferring radiant heat from the sun to said reservoir of water.

14. The apparatus of claim 12 wherein the second heat exchange coil of the three medium heat exchanger includes a water coil for circulating water from the reservoir through the three medium heat exchanger.

15. A method of heating or cooling an enclosure comprising the steps of:
   operating a heat pump to transfer heat between an indoor heat exchange coil located within the enclosure and an outdoor heat exchange coil located outside of the enclosure;
   transferring heat between the indoor coil and the enclosure by passing ambient air over the indoor coil;
   storing heat transferred between the indoor coil and the outdoor coil by circulating a heat storage medium between a heat storage facility and a heat storage medium coil located in thermal contact with the indoor coil; and
   transferring stored heat between the heat storage facility and the enclosure by circulating the heat storage medium between the heat storage facility and the heat storage medium coil and passing ambient air over the heat storage medium coil.

16. A heat transfer and storage system for maintaining a temperature within an enclosure comprising:
   a three medium heat exchanger including a first heat exchange coil, a second heat exchange coil, heat transfer means thermally connecting the first and second coils, and means to pass ambient air over the coils;
   a heat pump of the type having an indoor coil located within the enclosure and an outdoor coil located outside the enclosure, wherein the coil is the first coil of the three medium heat exchanger;
   a heat storage means for storing a heat transfer fluid; and
   connecting means connecting the heat storage means and the second coil of the three medium heat exchanger, wherein the heat transfer fluid circulates and transfers heat between the heat storage means and the three medium heat exchanger.

17. A system for transferring energy between a conditioned zone, a heat source or sink liquid storage, and an ambient zone comprising:
   refrigeration apparatus employing a liquefiable refrigerant and including compressor means, condensor heat exchange means, expansion means and evaporator heat exchange means connected in series in a closed cycle arrangement;
   housing means for said refrigeration apparatus;
   means to control the flow of ambient and conditioned air over at least one of said condensor and evaporator heat exchange means;
   a closed liquid filled path having portions in heat exchange relation with refrigerant carrying conduits in at least one of said heat exchange means; and
   means in said path for controlling the flow of liquid therein.

18. A system as defined by claim 17 including refrigerant diverter means operable to control the direction of flow of said liquefiable refrigerant.

19. A system as defined by claim 17 in which said housing means for said refrigeration apparatus includes diverter means for controlling the flow of ambient and conditioned air over said condensor and/or evaporator heat exchanger means.

20. A system for transferring energy between a conditioned zone and a heat source or sink liquid, storage, comprising:
   refrigeration apparatus employing a liquefiable refrigerant and including compressor means, condensor heat exchange means, expansion means and evaporator heat exchange means connected in series in closed cycle arrangement;
   housing means for said refrigeration apparatus;
   means to control the flow of conditioned air over at least one of said condensor and evaporator heat exchanger means;
   a closed liquid filled path having portions in heat exchange relation with refrigerant carrying conduits in at least one of said heat exchange means; and
   means in said path for controlling the flow of liquid therein.

21. A system as defined by claim 20 including in said housing means, diverter means for controlling the flow of conditioned air over at least one of said condensor and evaporator heat exchanger means.

22. A system as defined by claim 20 including refrigerant diverter means in said closed cycle arrangement for controlling the direction of flow of refrigerant therein.

* * * * *